United States Patent [19]
Wood et al.

[11] Patent Number: 5,428,740
[45] Date of Patent: Jun. 27, 1995

[54] APPLYING SUCCESSIVE DATA GROUP OPERATIONS TO AN ACTIVE DATA GROUP

[75] Inventors: William T. Wood, Arlington; David W. Peterson, Harvard, both of Mass.

[73] Assignee: Ventana Systems, Inc., Harvard, Mass.

[21] Appl. No.: 331,357

[22] Filed: Oct. 27, 1994

Related U.S. Application Data

[63] Continuation of Ser. No. 78,483, Jun. 16, 1993, abandoned, which is a continuation-in-part of Ser. No. 99,047, Jul. 28, 1993, abandoned, which is a continuation of Ser. No. 599,619, Oct. 18, 1990, abandoned.

[51] Int. Cl.⁶ .............................................. G06F 3/00
[52] U.S. Cl. .................................................... 395/161
[58] Field of Search ............................... 395/155–161, 395/140–143, 50, 52, 345, 500, 919–920, 425; 364/578

[56] References Cited

U.S. PATENT DOCUMENTS

| | | | |
|---|---|---|---|
| 4,611,306 | 9/1986 | Crehan et al. | 395/156 X |
| 4,674,042 | 6/1987 | Hernandez et al. | 395/140 X |
| 4,674,043 | 6/1987 | Hernandez et al. | 395/140 X |
| 4,772,882 | 9/1988 | Mical | 395/156 X |
| 4,794,553 | 12/1988 | Watanabe et al. | 395/140 |
| 4,800,510 | 1/1989 | Vinberg et al. | 395/140 |
| 4,827,404 | 5/1989 | Barstow et al. | 395/500 |
| 4,847,785 | 6/1989 | Stephens | 395/140 |
| 4,894,771 | 1/1990 | Kunii et al. | 395/600 |
| 4,899,136 | 2/1990 | Beard et al. | 395/157 |
| 4,901,221 | 2/1990 | Kodosky et al. | 395/161 X |
| 4,903,215 | 2/1990 | Masuishi et al. | 364/513 |
| 4,908,786 | 3/1990 | Kuno et al. | 395/140 |
| 4,937,036 | 6/1990 | Beard et al. | 395/500 |
| 4,939,507 | 7/1990 | Beard et al. | 395/500 |
| 4,965,743 | 10/1990 | Malin et al. | 395/920 |
| 4,970,657 | 11/1990 | Wolf | 364/513 |
| 4,989,162 | 1/1991 | Tanaka et al. | 364/513 |
| 5,021,976 | 6/1991 | Wexelblat et al. | 395/159 |
| 5,040,131 | 8/1991 | Torres | 395/159 |
| 5,148,379 | 9/1992 | Konno et al. | 364/578 |

OTHER PUBLICATIONS

Aker, Sharon, SuperPaint User's Manual for Macintosh, Silicon Beach Software, pp. 4–60–4–68, 1988.
Data Language Corporation, "The Magic of a Progress Application," in Progress Test Drive Manual, pp. 2-2 to 2-33, 1986.
Microsoft Corp., Getting Started with Microsoft Excel, pp. 1-15, 1988.
Microsoft Corp., "What's New in Microsoft Word", Getting Started with Microsoft Word, pp. 1-15, 1988.
Diederich et al., "Experimental Prototyping in Smalltalk", IEEE Software, May 1987, pp. 50–64.
Johnson et al., "The Xerox Star: A Retrospective", *Computer*, vol. 22, No. 9, Los Alamitos, Calif., Sep. 1989, pp. 11–28.
Helman et al., "Explanation Systems for Computer Simulations", Proceedings of the 1986 Winter Simulation Conference, pp. 453–459.
Eberlein et al., "Enhancing the Simulation Process", Proceedings of the 1991 Summer Computer Simulation Conference, Jul. 22, 1991, Baltimore, Md., pp. 21–25.

(List continued on next page.)

*Primary Examiner*—Mark R. Powell
*Assistant Examiner*—John E. Breene
*Attorney, Agent, or Firm*—Fish & Richardson

[57] ABSTRACT

In a data processing system employed for simulation, a simulation program (24) produces simulation results (26), while a pre-compiler (18) used to prepare the simulation program (24) generates cause and effect lists (22). The cause and effect lists (22) and simulation results (26) are organized in data groups associated with the various variables in the model. A presentation module (28) operates a display (16) so as to display variable names (37) that represent the data groups and icons (32, 34, 36, 38, 40, 42, and 44) that represent operations that can be performed on the data groups. By using a mouse (15) to "click on" a data-group name (48) and an icon (40–55, 59), the user can cause a selected data-group operation to be performed on a selected data group.

27 Claims, 4 Drawing Sheets

OTHER PUBLICATIONS

Shu, *Visual Programming*, "Future Prospects—Chapter 12", 1988, pp. 285-305.

Egan et al., "Behavioral Evaluation and Analysis of a Hypertext Browser", Human Factors In Computing Systems, CHI'89 Proceedings, pp. 205-210, May 1989.

Poltrock et al., "Graphic Interfaces for Knowledge-Based System Development", Human Factors in Computing Systems, CHI'89 Proceedings, pp. 9-50, Apr., 1986.

Shu, *Visual Programming*, "Visualization of Programs and Execution", Chapter 3, pp. 40-66, 1988.

Fisher et al., "A Control Panel Interface for Graphics and Image Processing Applications", CHI+GI Conference Proceedings, 1987, pp. 285-288.

Reddy et al., "The Knowledge-Based Simulation System", Mar. 1986, pp. 26-37.

Nemoto et al., "An Adaptive Subdivision by Sliding Boundary Surfaces", Graphics Interface, 1986, pp. 43-48.

Hoskins et al., "Some Implications of Dynamic Structural Analysis", Graphics Interface, 1986, pp. 7-10.

Waterman, *A Guide to Expert Systems*, "Prospector: An Expert System at Work", Chapter 6, 1986, pp. 49-60, 91.

Halasz, "Notecards in a Nutshell", CHI+GI 1987, pp. 45-52.

Franklin et al., "Debugging and Tracing Expert Systems", IEEE, pp. 159-167, 1988.

Ford et al., "An Intelligent Modeling System for Simulating Manufacturing Processes", Proceedings of the 1987 Winter Simulation Conference, pp. 525-529, Dec. 1987.

Siegel, "Expert Systems: A Non-Programmer's Guide to Development and Applications," The Reasoning Process, Chapters 7-8, pp. 71-102, 1986.

Javelin Software Manual, Javelin Software Corp., 1985, pp. 3, 37-51, 327-344.

Microsoft Works Users Guide, Microsoft Corp., 1989, pp.103-173.

Lucid 3-D Tutorial Guide, Personal Computer Support Group., Inc., 1987, Chpt. 7, 10, 11-1 to 11-13, 14—14 to 14-17, 15-8 to 15-9, 15-26 to 15-27, chpts. 16, 22, 23.

Lucid 3-D Reference Guide, Personal Computer Support Group, Inc., 1987, N-8 to N-25, D-20 to D-21, L-12 to L-13.

SuperChart, Computer Associates Int., Inc., 1987, 3-85 to 3-90, 3-103 to 3-147.

Franklin et al., "Debugging and Tracing Expert Systems", IEEE, 1988, pp. 159-167.

Frankowski et al., "The Engineering Information System User Interface Management System", IEEE, 1989, pp. 1301-1306.

Brown and Sedgewick, "Techniques for Algorithm Animation", IEEE Software, vol. 2, No. 1, Jan. 1985, pp. 28-39.

Raeder, "A Survey of Current Graphical Programming Techniques", IEEE Computer, vol. 118, No. 8, Aug. 1985, pp. 11-24.

Lotus 1-2-3 Release 2.2 Quick Reference, Que Corp., 1989, pp. 1-13, 18-19, 38-49, 58-59, 62-65, 94-98, 138-149.

INITIAL BALANCE(mary)
CURRENT: 700

APPLYING SUCCESSIVE DATA GROUP OPERATIONS TO AN ACTIVE DATA GROUP

This is a continuation of application Ser. No. 08/078,483, filed Jun. 16, 1993, now abandoned, which was a continuation of application Ser. No. 07/599,619, filed Oct. 18, 1990, now abandoned.

This is a continuation-in-part of U.S. patent application Ser. No. 08/099,047, filed on Jul. 28, 1993, now abandoned.

BACKGROUND OF THE INVENTION

The present invention is directed to user interfaces for data processing systems. It finds particular, although not exclusive, use in data processing systems used for complex simulations.

The capabilities of data processing systems have greatly advanced over the past several decades, and the amount of information that they can produce has similarly expanded. But the usefulness of the resulting information can depend to some degree on the ease with which the user can locate desired information in the mass of information that results.

Among the areas in which this is particularly true is that of simulation. Computer simulations have been employed on a wide variety of systems, such as electronic circuits, weather patterns, national economies, and manufacturing plants. All simulations depend on models, i.e., statements of relationships among the variables employed in the simulation. Once a model has been written, the data processing system performs the actual simulation; it computes series of values of the simulation variables as functions of an independent variable, typically time.

One obvious reason for performing a simulation is simply to predict performance, i.e., to answer questions such as, What will XYZ Corporation's revenues be for the next 18 months? In this case, the variable of interest is revenues while the independent variable is time.

But a simulation often is used not simply to determine what a result will be but also to determine why the results are what they are and, generally, to obtain insight into the operation of the simulated system. For these purposes, the user often must investigate values of variables other than those of a small number of ultimate result variables. This in turn requires that the user determine which of the possibly thousands of variables he should inspect. These questions require the insight of the human user and often a significant level of concentration, which may not be achievable if too much of the user's attention must be devoted to the mechanics of the interface between the user and the data processing system.

SUMMARY OF THE INVENTION

The present invention provides an efficient, natural interface between the user and that part of the data processing system that presents data to the user. A data processing system according to the present invention includes a memory for storing data groups, such as the simulation results for different variables in the model of a simulated system. Each data group is associated with a different group name, which may be the same as the name of the variable whose simulation results the data group contains. The data processing system includes means for displaying the names of data groups and for displaying the "tool symbols" associated with respective data-group operations. The user employs some type of input means, such as a mouse, to designate a displayed data-group name and tool symbol. In response, the data processing system performs the operation represented by the tool symbol on the data group represented by the designated name. We have found that this provides a very natural user interface, particularly when the data processing system is used for simulation.

The data-group operations represented by the tool symbols may include, for instance, displays of the names and graphs of the values of the variables that are the "causes" of the variable whose name the user designates. By observing the cause graphs, the user can determine which of the causes is of greatest interest, and he can use a mouse or other input device to designate the name of that cause variable and specify the cause-graphing tool again. By repeating these functions, he can investigate the system in a natural manner. The user can thus maximize his concentration on the actual investigation rather than on the mechanics of requesting that the computer present the needed information.

The accompanying claims define these and further features of the invention with more precision.

BRIEF DESCRIPTION OF THE DRAWINGS

These and further features and advantages of the present invention are described by reference to the accompanying drawings, in which.

DETAILED DESCRIPTION OF AN ILLUSTRATIVE EMBODIMENT

Figure 1:
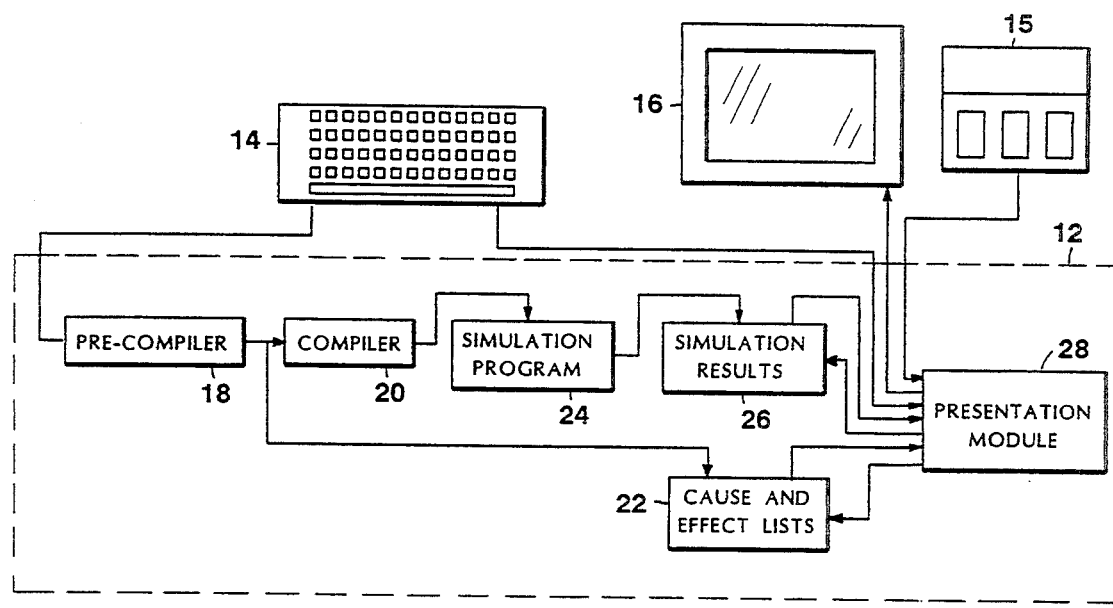
FIG. 1 is a block diagram of a simulation system in which the teachings of the present invention might be employed.

FIG. 1 depicts in diagrammatic form a simulation system of the type that can embody the teachings of the present invention. Such a system typically includes a computer, which FIG. 1 symbolizes by the contents of the computer's memory, represented by dashed lines 12. Appropriate input devices such as a keyboard 14 and a mouse 15 are coupled to the computer. The keyboard is depicted in such a manner as to represent its use to enter a simulation model, while the mouse 15 is so depicted as to suggest its use to control the presentation of simulation results. But both input devices can be used for either or both functions.

Among the computer's software modules is a pre-compiler 18. The pre-compiler 18 is the programming that enables the computer 12 to perform a number of functions having to do with the appropriate interpretation of the information that the user enters by way of the keyboard 14 to define the simulation model. The entries made from the keyboard 14 are ultimately compiled into object code—i.e., into machine-language instructions.

In theory, a single program could be used to make a direct conversion from the user's modeling language to the machine language that the computer hardware employs. But FIG. 1 depicts the software in its more typical, two-part form, in which a pre-compiler 18 recognizes the simulation language and converts it into source code of a compiler language, such as C, and a compiler 20 converts the source code into machine code. In addition to converting the simulation language into C, the pre-compiler 18 may also create cause and effect lists in a manner described in more detail in U.S. patent application Ser. No. 08/099,047, of William T. Wood for A Simulation System Employing Causal Tracing, which was filed on Jul. 28, 1993, and assigned to the assignee of the present invention.

As that application describes in more detail, the simulation model is written as a set of equations typically entered from the keyboard by the user. Each of the equations defines a relationship between an effect variable and each of the variables that are its proximate causes. The effect variable in an equation is a proximate effect of each of the cause variables in that equation. The cause and effect lists include a list of all of the proximate causes of each variable as well as a list of all of its proximate effects. These lists are used during the presentation of the results in a manner described briefly below and in more detail in the Wood application.

The machine code generated by the compiler module 20 is a simulation program 24, which the computer 12 runs to generate simulation results 26. The results typically take the form of series of values of the various variables as functions of time. To investigate the results and the model, the user employs the mouse 15 to interact with a presentation module 28, which controls the display device 16.

To illustrate the operation of the invention, let us suppose that the computer 12 is to simulate the activity in a bank's accounts. To provide a model for such activity, the user may begin with an entry such as the following:

---

BALANCE[CLIENT] = INTEG(MONEY_IN[CLIENT] − MONEY_OUT[CLIENT],
   INITIAL_BALANCE[CLIENT])
   ~dollars
   ~The total money in the bank balances of the clients.
   |
MONEY_IN[CLIENT] = INTEREST[CLIENT] + DEPOSITS[CLIENT]
   ~dollars/week
   ~The total money in each account at the start of a
   simulation.
   |
MONEY_OUT[CLIENT] = WITHDRAWALS[CLIENT] + FEES[CLIENT]
   ~dollars/week
   ~The total money leaving the bank account each time
   period.
   |
INITIAL_BALANCE[MARY] = 700~~
   |
INITIAL_BALANCE[JOHN] = 700
   ~dollars
   ~The initial money in each account at the start of a
   simulation.
   |
INTEREST[CLIENT] = BALANCE[CLIENT] * INTEREST_RATE[CLIENT]
   ~dollars
   ~The interest payment received.
   |
INTEREST_RATE[CLIENT] =   FIRST_IF_TRUE(BALANCE[CLIENT] <1500,
                          LOW_INTEREST_RATE,
                          HIGH_INTEREST_RATE) / 100
   ~dimensionless
   ~The fractional rate of interest, which depends on the
   amount of money in the bank.
   |
LOW_INTEREST_RATE = 8.00
   ~dimensionless
   ~The interest rate in percent if the balance is below
   $1,500.
   |
HIGH_INTEREST_RATE = 9.00
   ~dimensionless
   ~The interest rate in percent if the balance is above
   $1,500.
   |
DEPOSITS[MARY] = 600~~
   |
DEPOSITS[JOHN] = 450
   ~dollars/week
   ~The weekly salaries deposited into their accounts.
   |
WITHDRAWALS[MARY] = 475~~
   |
WITHDRAWALS[JOHN] = 300
   ~dollars/week
   ~The amount of money taken out of the account each
   week.
   |

```
FEES[CLIENT] = FIRST_IF_TRUE(BALANCE[CLIENT] <1000, 0.50,0)
    ~dollars/week
    ~If the balance goes below $1000, a $2 per month fee is
     charged. |
```

The first entry in the simulation defines relationships for two variables. Since the subscript CLIENT can have two values, namely, MARY and JOHN, the first entry essentially represents two equations, one in which the value of the subscript in all of the subscripted variables is MARY and the other in which it is JOHN.

The first statement specifies that the BALANCE at any given time is the sum of an initial value INITIAL_BALANCE[CLIENT] and the integral of the difference between MONEY_IN[CLIENT] and MONEY_OUT[CLIENT] between some initial time and the given time. As before, the entry after the first tilde represents the dimensions (dollars), and the entry after the second tilde is a comment explaining the meaning of BALANCE[CLIENT]. Note that the effect variable for this entry is BALANCE[CLIENT], while the cause variables are MONEY_IN[CLIENT], MONEY_OUT[CLIENT] and INITIAL_BALANCE[CLIENT]. Again, the vertical line indicates the end of the entry for BALANCE[CLIENT].

The next entry defines a relationship between the variable MONEY_IN[CLIENT] and the variables INTEREST[CLIENT] and DEPOSITS[CLIENT]. The entry indicates that MONEY_IN has the dimension dollars/week and explains that MONEY_IN is a rate.

The next entry defines MONEY_OUT as the sum of the variables WITHDRAWALS and FEES.

Unlike the first three entries, each of which actually represents two equations, the next entry represents only one equation; it uses as a subscript the constant MARY rather than the variable CLIENT. The fifth entry similarly represents only one equation. In accordance with the syntax of the model-writing language, the dimensions and comments for two variables that differ only in subscripts can be written in common, even though their equations are entered separately, and this is the result of following the first equation simply with two tildes and a vertical line but following the second equation with a dimension and a comment.

The sixth entry, the one for INTEREST[CLIENT], is self-explanatory. The seventh entry describes a two-level interest rate. It states that INTEREST_RATE[CLIENT] takes on the value of LOW_INTEREST_RATE/100 if the BALANCE[CLIENT] is less than $1,500 and is equal to HIGH_INTEREST_RATE/100 otherwise.

Although the foregoing equations do not mention time explicitly as an independent variable, reflection reveals that the first equation invokes it implicitly, and many of the variables consequently are functions of time. Specifically, since the first equation invokes the function INTEG, which represents evaluation of a definite integral whose upper limit depends on time, BALANCE[CLIENT] is a function of time. Since the variable FEES[CLIENT] depends on BALANCE[CLIENT], it also is time-dependent, as are INTEREST_RATE[CLIENT], INTEREST[CLIENT], MONEY_OUT[CLIENT], and MONEY_IN[CLIENT].

The purpose of the simulation program is to evaluate the various variables at successive values of the independent variable, which is typically assumed to be time. Accordingly, the simulation language will typically have variables reserved for this function, and the user may give them values in the following manner:

```
FINAL_TIME = 1995
    ~year
    ~The final time for the simulation.
    |
INITIAL_TIME = 1990
    ~year
    ~The initial time for the simulation.
    |
TIME_STEP = 1/52
    ~year
    ~The time step for the simulation is one week.
    |
SAVEPER = TIME_STEP
    ~year
    ~The frequency with which data is stored.
    |
```

The first two entries tell when, in simulated time, the simulation is to start and stop. The third entry specifies that the simulation is to make successive calculations in steps of one week of simulated time. The user may not be interested in the results of each week; he may instead be interested only in the results of each year. In such a situation, the simulation would not need to retain the weekly results for display purposes, and it could discard them as soon as they are no longer needed for subsequent calculations. In the illustrated example, however, the user wants to see all of the results, and the fourth entry, which specifies that the save period is equal to the time step, gives this information to the simulation routine.

With this simulation program entered, the user commands the computer to run the simulation program 24, which thereby produces results 26. The memory containing the simulation results can be thought of as being organized into data groups, one for each variable, containing the simulation results as well as other information related to the associated variables, such as its cause and effect lists, the equations in which they are the effects, comments regarding the equations, and so forth.

Figure 2:
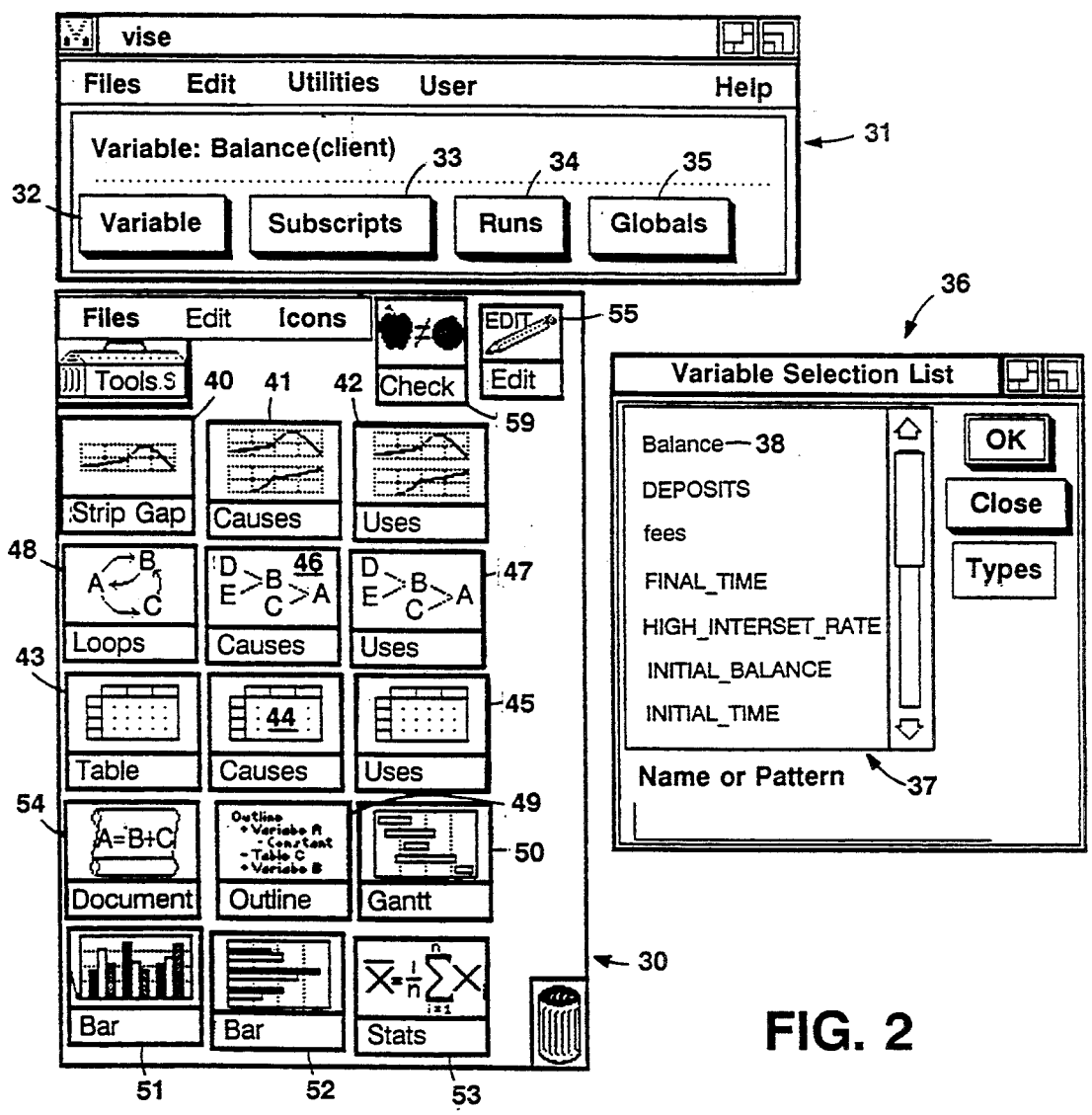
FIG. 2 is a representation of a display that such a system might present to a user to display the data-group names and tool symbols by which the user communicates with the system.

In one embodiment of the invention, the presentation module 28 then presents the user a display of the type shown in FIG. 2. A number of the items of the display are not relevant to the present invention, and they will not be described here. But a major part of the display is a "toolbox" area 30, which contains a number of tool symbols of the type that can be employed in the present invention. The tool symbols typically take the forms of icons, by which the user can choose one of a number of data-group operations.

Above the toolbox area 30 is a "workbench" area 31, which includes a number of "buttons" 32–35. These buttons contain the legends "variable," "subscripts," "runs", and "globals". The user may "click on" the "variable" button 32 by using a mouse or other input device to move a display cursor over it and then pushing a button on the input device. This indicates that the user wishes to place a variable in the workbench, and a window 36 pops up in response. The part of the window relevant to the present invention is a list 37 of the variables in the simulation that he has entered. For the purposes of illustration, we assume that the user then moves the cursor over the "balance" entry 38 in the list and, say, double clicks on it. As a result, that variable appears, as shown, in the workbench.

As FIG. 2 shows, the variable BALANCE is shown with its variable subscript name, namely, CLIENT. The user could then click on the "subscripts" button 33 to enter one of the individual values for CLIENT, namely, MARY or JOHN, but we will assume for the purposes of the present explanation that he does not. Instead, he proceeds directly to choosing a data-group operation by clicking on one of the tool symbols in the toolbox 30. The chosen data-group operation is then performed on the data groups represented by BALANCE[CLIENT], i.e., by the name displayed in the workbench area 31.

We refer to the identifiers of the data groups by the term names and to the identifiers of the data-group operations by the term symbols. This nomenclature was chosen for its intuitive appeal, since the identifiers of the operations are typically in the forms of icons, while those of the data groups are typically alphanumeric. But the tool symbols can just as well take other forms, such as groups of alphanumeric characters, while the names of the data groups, although almost always in the forms of strings of alphanumeric characteristics, can just as well be icons.

Figure 3:
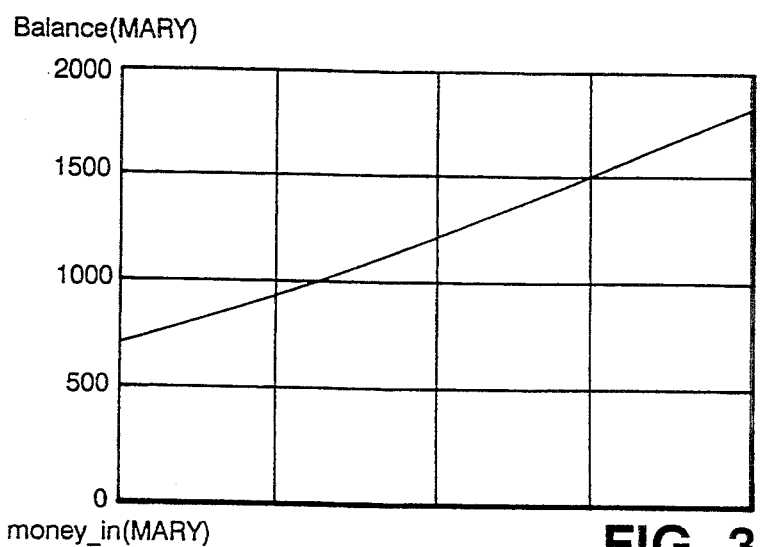
FIG. 3 is a representation of the display that results when the user employs the graphing operation provided by the illustrated embodiment of the invention.

One of the tool symbols that the user may designate is icon 40, which represents the operation of graphing as functions of time the values that the simulation has calculated for the variable whose name is displayed in the workbench. If the simulation has been run more than once, the user can use the "runs" button to specify the run whose results he wants to graph. Since the user has not specified a particular subscript, the name in the workbench actually represents two variables, both of which the presentation module 28 graphs in response to designation of the graphing icon 40. The particular icon shown represents a strip graph, i.e., a graph in which different variables are plotted on different axes, but a typical embodiment of the present invention will also provide a data-group operation in which the several graphed variables are plotted on common axes. FIG. 3 represents part of the resultant display, namely, the graph of the values of BALANCE[MARY] as a function of time. BALANCE[JOHN] would also be graphed.

The data-group operations represented by tool symbols 41 and 42 are similar to the one represented by tool symbol 40; they all represent graphing data. Tool symbol 41 represents graphing the proximate cause variables of the variable whose name is in the workbench area 31, and symbol 42 represents graphing its proximate effect variables.

Figure 4:
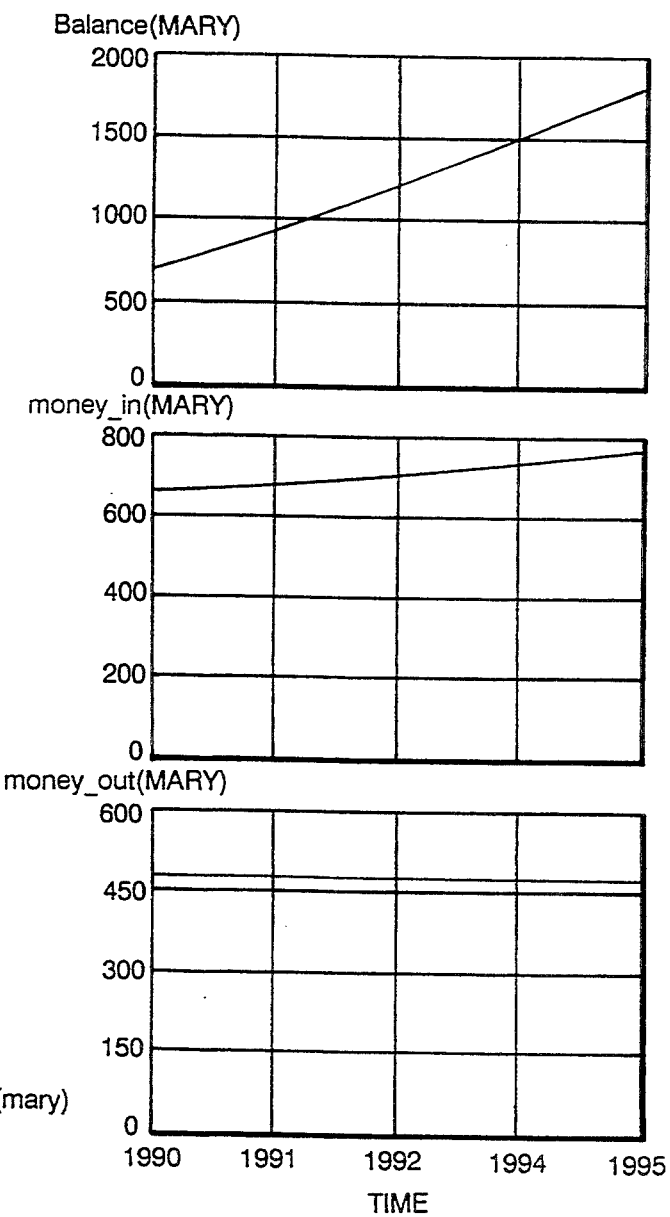
FIG. 4 is a representation of the display that results when the user employs the causes operation.

For instance, clicking on tool symbol 41 would result in the display depicted in FIG. 4, namely, a plot of BALANCE[MARY] as well as of its three proximate causes MONEY_IN[MARY], MONEY_OUT[MARY], and INITIAL_BALANCE[MARY]. The first two of these cause variables are shown graphically, while INITIAL_BALANCE[MARY], which is a constant, is merely displayed numerically. The display would similarly show BALANCE[JOHN] as well as its causes.

Tool symbols 43, 44, and 45 represent operations that parallel those represented by symbols 40, 41, and 42, with the exception that the operations that they represent present the data in tabular, rather than graphical, form.

Tool symbols 46 and 47 represent data-group operations that parallel those of the operations represented by tool symbols 41 and 42 in that they call for presentation of causes and effects, respectively. Rather than causing the values to be displayed, however, they merely cause the names of the causes and effects to be displayed, and they show not only proximate causes but also other causes to a level three deep in the causal chain.

Figure 5:
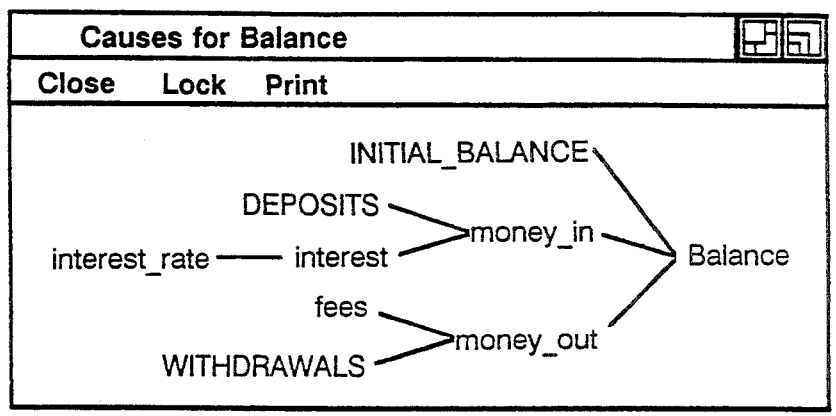
FIG. 5 is a representation of the display that results when the user employs the causal-tree operation.

To obtain further insight into the causes of BALANCE[CLIENT], for example, the user may click on tool symbol 46. The result is the display shown in FIG. 5, which is a tree diagram of the causes of BALANCE[CLIENT]. This diagram lists not only INITIAL_BALANCE, MONEY_IN, and MONEY_OUT, which are the proximate causes of BALANCE[CLIENT], but also variables on which those proximate causes depend.

The operation represented by tool symbol 46 is arranged to display only three levels of causation. Moreover, even if the BALANCE entries at the left side of the diagram were not disposed three levels deep in the causal chain, cause variables for them would not additionally be shown, since they are the same as those for the same, ultimate effect variable BALANCE at the right, and further display of the causes of these variables would thus be redundant. The fact that there is such a causal loop is indicated by the angle brackets in the drawing.

Figure 6:
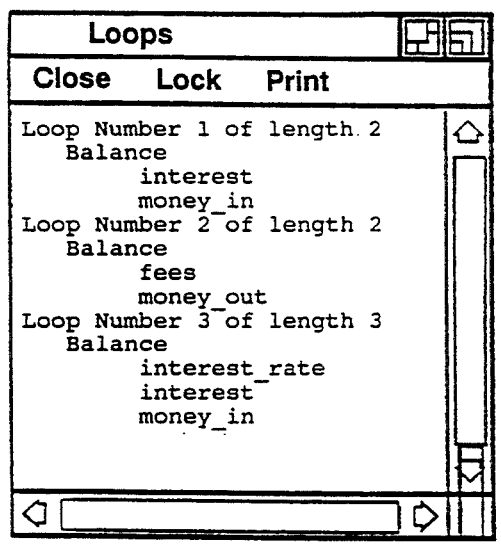
FIG. 6 is a representation of the display that results when the user employs the loops operation.

In order to identify any such loops, the user may click on tool symbol 48, which requests a list of loops. The result would be the display of FIG. 6. The display of FIG. 6 lists loops in tabular form and shows not only the two loops that are evident from the display of FIG. 5 but also a third loop, which would have been evident if the tree display of FIG. 5 had been extended by one level.

Figure 7:
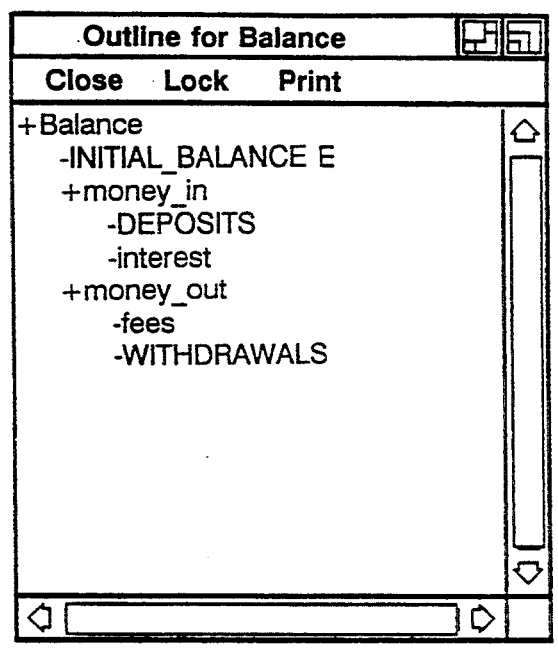
FIG. 7 is a representation of the display that results when the user employs the outline operation.

The causes of BALANCE can be shown in yet another way by clicking on tool symbol 49, which gives a causation tree in tabular form, as FIG. 7 shows.

Tool symbols 50, 51, and 52 represent further graphing operations, which will not be separately illustrated. Tool symbol 50 represents preparation of a Gantt chart. Clicking on that tool symbol causes both of the BALANCE[CLIENT] variables to be displayed in a Gantt chart, in which the bars that represent their presence would start and stop at the points in time at which the values of those variables pass through predetermined thresholds. Clicking on tool symbols 51 and 52 would cause display of vertical and horizontal bar charts that would depict the values of the two variables BALANCE[MARY] and BALANCE[JOHN] at a predetermined point in time. To set the time limits on the displays, the thresholds for the Gantt charts, and other display parameters, the user clicks on the "globals" button and is provided with displays that enable him to perform such operations.

Clicking on tool symbol 53 would result in computation and display of certain basic statistics, such as mean, deviation, etc.

The user may also want to review the entries that he made for the variable in creating the model. For this purpose, he may click on tool symbol 54, which would cause display of the entries that he made to define the variable whose name is on the workbench. Such an operation may simply show the equation, or it may additionally show the entered units and any comments that the user entered. At this point, the user may have learned something through his review of the data and may want to record the information for further reference by adding it to the comment that he initially entered. For this purpose, he can click on tool symbol 55, which would enable him to edit the entry for that variable.

A final tool symbol is symbol 59. This symbol represents the operation of performing a dimensional analysis on the equation in which the variable in the workbench is the effect. That is, clicking on this symbol causes this system to determine whether the units written in the equation are consistent and generates a display that tells the user the results of that determination.

For the sake of explanation, the model illustrated above is very simple and can readily be understood without using the more-sophisticated features of a simulation program. But it is not uncommon for a simulation to involve thousands of equations and tens of thousands of variables. It is in such simulations that the ease of presentation afforded by the present invention yields the greatest advantage. This is particularly true when the invention is embodied in a system that is capable of data-group operations like the cause and effect operations described above, which place on the display the names of the data groups associated with the cause or effect variables of the variable whose name is currently "on the workbench."

In investigating a particular variable, for example, a user can display a causation tree by simply clicking on tool symbol 46 or 49, as was described above. When the tree is displayed, he can then look at a particular cause variable by merely clicking twice on its displayed name and once on the appropriate tool symbol, which may be the graph symbol 34. After seeing the behavior of that particular variable, the user may want to find out what else that variable affects, and he may therefore click on the effect-tree symbol 47. In this way, the user moves in a very natural way through the chains of causation in the model.

Because of the natural way in which he is able to work, the user can concentrate more on the model and less on the process of interacting with the computer than he could with a less natural presentation scheme. The use of the present invention thus greatly facilitates the user's investigation of the behavior of a computer model, and it thus constitutes a significant advance in the art.

We claim:

1. A data processing system for aiding a user to analyze a simulation model having equations which represent relationships among cause variables and effect variables, the variables taking on successive values, the system comprising:
    A) means for receiving and storing user entries representing the equations,
    B) a memory for storing data groups identified by different respective group names, each data group representing a variable of said simulation model
    C) a display for displaying
        (1) said group names,
        (2) operation symbols representing respective data-group operations, said data-group operations yielding information about variables represented in the equations of the simulation model, and
        (3) said information yielded by said data-group operations;
    D) input means for designating by action of a user a succession of selected displayed operation symbols; and for designating a displaced group name of a data group as being an active data group to be subjected to successive said data-group operations, said active data group remaining active for said successive operations without being repeatedly redesignated,
    E) means responsive to a designation of a displayed group name for displaying a corresponding data group as the active data group; and responsive to a designated said displayed operation symbol for performing a data-group operation represented by said designated operation symbol on said active data group to derive said information yielded by said data-group operation without altering the values of the variable represented by said active data group, and for displaying the information yielded by said data-group operation; and responsive to another designated said displayed operation symbol for performing another data-group operation represented by said other designated operation symbol on the same said active data group deriving said information yielded by said other data-group operation without altering the values of the variable represented by said active group, and for displaying the information yielded by said data group operation,
        wherein, if a variable represented by the group name of the data group on which a data-group operation is performed is a cause of the variable, then a causal loop exists,
        at least one of the data-group operations including:
        i) determining whether the variable represented by the group name of the data group on which that data-group operation is performed is a cause of the variable and defines at least one causal loop; and
        ii) if so, displaying the group names representing each variable in the at least one defined causal loop.

2. The system of claim 1, wherein at least one of the data-group operations performed on a data group includes displaying a group name of an effect variable of the variable represented by the data group.

3. The system of claim 2 wherein at least one of the data-group operations performed on a data group includes graphically displaying the values taken on by an effect variable of the variable represented by the data group.

4. The system of claim 2 wherein at least one of the data-group operations performed on a data group includes displaying in a tree format the group names representing the effect variables of the variable represented by the data group.

5. The system of claim 1 wherein at least one of the data-group operations performed on a data group includes displaying an equation in which the variable represented by the data group is an effect variable.

6. The system of claim 5 wherein the equation is associated with a user-entered comment, and said at least one of the data-group operations includes displaying the user-entered comment associated with the equation.

7. The system of claim 1 wherein at least one of the data-group operations includes making a determination of whether the units of an equation are consistent, an effect variable in the equation being the variable represented by the group name of the designated data group, and generating an indication of a result of that determination.

8. The system of claim 1, wherein at least one of the data-group operations performed on a data group includes displaying a group name of a cause variable of the variable represented by the data group.

9. The system of claim 8 wherein at least one of the data-group operations performed on a data group includes graphically displaying the values taken on by a cause variable of the variable represented by the data group.

10. The system of claim 8 wherein at least one of the data-group operations performed on a data group includes displaying in a tree format the group names representing the cause variables of the variable represented by the data group.

11. A computer method for aiding interactive analysis of a simulation model having equations that define relationships among cause variables and effect variables, each of the variables taking on a series of values with changes of an independent variable, each value of each of the effect variables depending on values of one or more cause variables, the method comprising the steps of:
- (a) displaying, to a user, variable identifiers of the cause variables and the effect variables,
- (b) enabling the user to designate one of the cause or effect variables by selecting a corresponding one of the variable identifiers,
- (c) displaying, to a user, two operation identifiers associated respectively with a cause operator and an effect operator,
- (d) enabling the user to designate the cause operator or the effect operator by selecting one of the two operation identifiers,
- (e) displaying, in response to the user designating a variable identifier and an operation identifier, a graph of a series of values of the designated variable with respect to the independent variable, and a graph of a series of values of a variable which is a cause variable or an effect variable with respect to the designated variable, the graphs being displayed one above another with a value of the independent variable of one graph being aligned with the same value of the independent variable of the other graph, a scale of the independent variable being identical in both graphs,
- (f) repeating steps (a), (b), and (e) for another designated variable, and
- (g) repeating steps (c), (d), and (e) for another designated operator.

12. A computer method for aiding interactive analysis of a simulation model having equations that define relationships among cause variables and effect variables, each of the variables taking on a series of values with changes of an independent variable, each value of each of the effect variables depending on values of one or more cause variables, the method comprising the steps of:
- (a) displaying, to a user, variable identifiers of the cause variables and the effect variables,
- (b) enabling the user to designate one of the cause or effect variables by selecting a corresponding one of the variable identifiers,
- (c) displaying, to a user, two operation identifiers associated respectively with a cause operator and an effect operator,
- (d) enabling the user to designate the cause operator or the effect operator by selecting one of the two operation identifiers,
- (e) displaying, in response to the user designating a variable identifier and an operation identifier, a graph of a series of values of the designated variable with respect to the independent variable, and a graph of a series of values of a variable which is a cause variable or an effect variable with respect to the designated variable, the graphs being displayed one above another with a value of the independent variable of one graph being aligned with the same value of the independent variable of the other graph, a scale of the independent variable being identical in both graphs.

13. A computer method for aiding interactive analysis of a simulation model having equations that define relationships among cause variables and effect variables, each of the variables taking on a series of values with changes of an independent variable, each value of each of the effect variables depending on values of one or more cause variables, the method comprising the steps of:
- (a) displaying, to a user, variable identifiers of the cause variables and the effect variables,
- (b) enabling the user to designate one of the cause or effect variables by selecting a corresponding one of the variable identifiers,
- (c) displaying, to a user, two operation identifiers associated respectively with a cause operator and an effect operator,
- (d) enabling the user to designate the cause operator or the effect operator by selecting one of the two operation identifiers,
- (e) displaying, in response to the user designating a variable identifier and an operation identifier, a graph of a series of values of the designated variable with respect to the independent variable, and a graph of a series of values of a variable which is a cause variable or an effect variable with respect to the designated variable,
- (f) repeating steps (a), (b), and (e) for another designated variable, and
- (g) repeating steps (c), (d), and (e) for another designated operator.

14. A computer method for aiding interactive analysis of a simulation model having equations that define relationships among cause variables and effect variables, each of the variables taking on a series of values with changes of an independent variable, each value of each of the effect variables depending on values of one or more cause variables, the method comprising the steps of:
- (a) displaying, to a user, variable identifiers of the cause variables and the effect variables,
- (b) enabling the user to designate one of the cause or effect variables by selecting a corresponding one of the variable identifiers,
- (c) displaying, to a user, two operation identifiers associated respectively with a cause operator and an effect operator,
- (d) enabling the user to designate the cause operator or the effect operator by selecting one of the two operation identifiers,
- (e) displaying, in response to the user designating a variable identifier and an operation identifier, a graph of a series of values of the designated variable with respect to the independent variable, and a graph of a series of values of a variable which is a cause variable or an effect variable with respect to the designated variable.

15. The method of claim 14 further comprising repeating steps (a), (b), and (e) for another designated variable.

16. The method of claim 14 further comprising repeating steps (c), (d), and (e) for another designated operator.

17. The method of claim 14 further comprising displaying said graphs one above another.

18. The method of claim 17 further comprising vertically aligning a value of the independent variable of one graph with the same value of the independent variable of the other graph.

19. The method of claim 18 wherein a scale of the independent variable is identical in both graphs.

20. The method of claim 14 further comprising enabling a user to define the equations in the simulation model.

21. The method of claim 14 further comprising performing a first simulation by determining from the equations a series of values assumed by each variable for a succession of values of the independent variable.

22. The method of claim 21 further comprising performing a second simulation, and enabling a user to designate either the first simulation or the second simulation, wherein the step of displaying the graph of the designated variable comprises displaying a graph of the series of values of the designated variable that is determined in the simulation designated by the user.

23. The method of claim 14 wherein the variable identifiers comprise names.

24. The method of claim 14 wherein the operation identifiers comprise symbols.

25. The method of claim 14 further comprising displaying another cause variable or another effect variable of the designated variable non-graphically.

26. The method of claim 14 wherein the designated variable represents more than one data group, each data group taking on a specific series of values with changes of the independent variable, and wherein displaying a graph of the designated variable comprises displaying a separate graph for each series of values of each data group represented by the designated variable.

27. The method of claim 26 wherein the step of displaying a graph of the cause variable or the effect variable of the designated variable comprises displaying a graph of a series of values of a cause variable or an effect variable for each data group.

* * * * *

UNITED STATES PATENT AND TRADEMARK OFFICE
CERTIFICATE OF CORRECTION

PATENT NO. : 5,428,740

DATED : June 27, 1995

INVENTOR(S) : William T. Wood et al.

It is certified that error appears in the above-identified patent and that said Letters Patent is hereby corrected as shown below:

```
      Col. 4, line 21, after "the following:" insert
--CLIENT:  MARY, JOHN
         - nil
         -  The list of people who have bank accounts.
      This is a preliminary statement.  The colon indicates
that the variable at the left of it is a subscript variable
whose values can be any of those at the right of the colon.
We will assume that the particular model-writing language
employed requires, for each such entry, two tildes and a
vertical line; the first tilde represents the beginning of a
dimension-entry field, the second tilde represents the
beginning of a comment-entry field, and the vertical line
represents the end of the current entry.
      After the initial entries, the user may then enter the
model by using entries such as these:--.

Col. 10, claim 1, line 3, "displaced" should be --
displayed--.
```

Signed and Sealed this

Seventh Day of May, 1996

Attest:

BRUCE LEHMAN

Attesting Officer

Commissioner of Patents and Trademarks